July 20, 1926.
J. C. FORD
1,592,941
GLARESHIELD ATTACHMENT
Filed Sept. 10, 1925
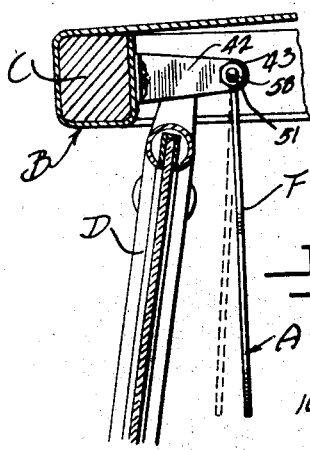
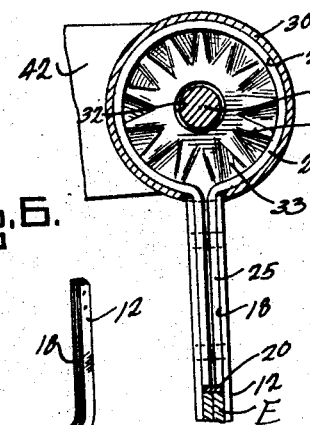
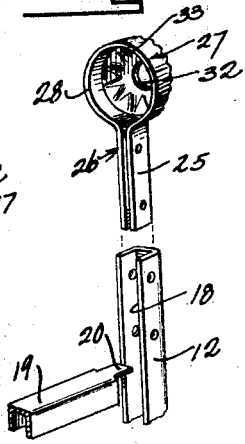
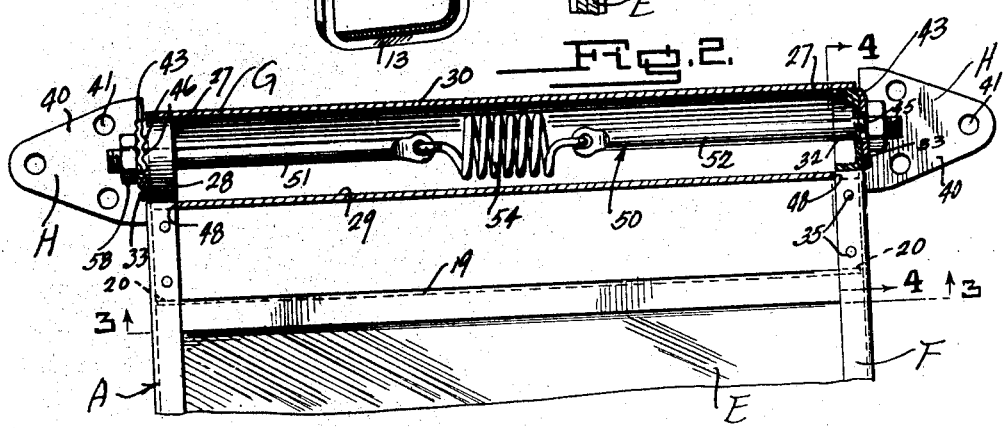
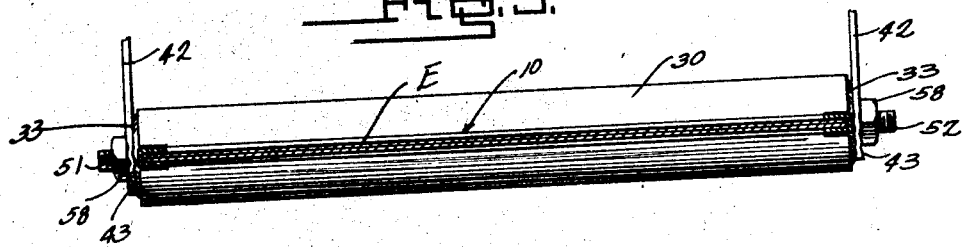
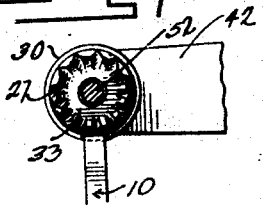
Inventor
Julius C. Ford Patented July 20, 1926.

1,592,941

UNITED STATES PATENT OFFICE.

JULIUS C. FORD, OF MEMPHIS, TENNESSEE, ASSIGNOR TO MARY E. FORD.

GLARESHIELD ATTACHMENT.

Application filed September 10, 1925. Serial No. 55,545.

This invention relates to improvements in glare shield attachments for automotive vehicles.

The primary object of this invention is the provision of a novel type of glare shield for use with motor vehicles, embodying improvements upon the type of glare shield set forth in my co-pending application Serial No. 17,794 filed March 23, 1925; the improvements consisting in a novel type of frame structure, and an improved mounting and clutch tensioning means.

A further object of this invention is the provision of a glare shield attachment which may be economically manufactured and applied with facility to any types of motor vehicles.

Other objects and advantages of the invention will be apparent during the course of the following detailed description.

In the accompanying drawing, forming a part of this specification, and wherein similar reference characters designate corresponding parts throughout the several views.

Figure 1 is a fragmentary sectional view of the windshield of an automobile and its adjacent roof structure showing the improved glare shield as applied thereto.

Figure 2 is a fragmentary view partly in cross section showing the improved details of the glare shield.

Figure 3 is a cross sectional view taken substantially on the line 3—3 of Figure 2.

Figure 4 is a cross sectional view taken substantially on the line 4—4 of Figure 2.

Figure 5 is a fragmentary perspective view showing the associated relation of details of the glare shield in position about to be assembled.

Figure 6 is a perspective view of a novel frame detail of the invention.

Figure 7 is a fragmentary view partly in section showing an end portion of the glare shield.

In the drawing, wherein for the purpose of illustration is shown only a preferred embodiment of this invention, the letter A may generally designate the improved antiglare shield, adapted to be mounted upon some part of a motor vehicle B, such as the roof C, so that the glare shield is readily accessible to the operator of the vehicle at the inner side of the windshield D. The shield A may of course be attached to other parts than the roof C, such as direct to the windshield D.

The improved glare shield A comprises a frame construction F adapted to support therein translucent panes E; and includes means G for the mounting of the frame F in adjustable clutching manner with brackets H.

Referring to the frame F, the same preferably comprises a channel shaped body 10, comprising integrally connected side portions 11 and 12, and a connecting portion 13 so that the same is U-shaped, with the channel groove, provided by the portions 11, 12 and 13 facing to receive the translucent material E, which is either of the flexible pyroxyline or mica type, or of glass, or any other improved material, in one or a plurality of sheets or panes, as is illustrated in the drawing. Incident to the U-shaped formation of the body 10 the sheets or panes E may readily be slipped into the groove 18, and at the upper edge of the material E, a cross piece 19 of the frame F is positioned. This cross piece 19 is of channel shaped formation, providing a groove which receives the upper edge or margin of the material E therein, and this cross piece 19 at its outer ends is provided with reduced lips or extensions 20 adapted to be slipped into the facing grooves of the side portions or legs 11 and 12 of the frame body 10, as is illustrated in the drawing. This enables the cross piece 19 to be adjusted tightly against the material E to clamp the same in the frame, during assemblage, and incident to this arrangement the frame legs or portions 11 and 12 may flex somewhat to accomplish the clutching feature for securing the shield in position as will be subsequently mentioned.

It is to be particularly noted that the upper free ends of the portions 11 and 12 of the frame body 10 extend above the cross portion 19, and the grooves of these upper portions of the frame parts 11 and 12 each receive the reduced shank 25 of a clutch member 26, which also includes a head 27 of substantially cylindrical formation. The head portion 27 includes the annular wall 28, of a diameter substantially equivalent to the passage 29 of a sleeve or barrel 30 of the means G, for fitting therein. Furthermore, each of these heads 27 includes an outer wall 33 corrugated, or stamped to provide radial teeth projecting outwardly of the plane of the exterior surface of said wall 33, for the purpose of clutching engagement with ends of the brackets H, as will be subsequently described. The reduced shanks or portions 25 of the clutch members 26 are assembled in the upper ends of the portions 11 and 12 of the frame body 10, and riveted therein as at 35, to secure the same in place so that the heads 27 are disposed at the free ends of the frame portion 11 and 12, with the transverse apertures 32 of the wall portion 33 thereof in aligning relation, and with the cylindrical heads 27 lying in parallel planes transversely of the plane of the frame F, and with the corrugations or teeth of the walls 33 facing outwardly from the side edges of the frame.

As a means of retaining the cross member 19 of the frame in place, it is to be noted that the lower edges of the shanks 25 abut against the lips 20 of the cross member 19 to hold the same in place against displacement.

The brackets H are of any improved formation, including attaching feet 40, provided with openings 41 for receiving screws and the like whereby to attach the same to the roof or windshield or other part of the conventional automobile. Each bracket furthermore includes an arm 42 right angled from the attaching foot 40 which at the free end thereof is provided with a clutch part 43 transversely apertured at 45, and stamped or otherwise suitably formed to provide the corrugations or radial teeth 46 at the inner face thereof, for cooperation between the teeth or corrugations of the wall 33 of one of the clutch heads 27.

The means G consist in the provision of the sleeve or tubular supporting member 30, providing the passageway 29 therethrough, open at the ends for receiving the head portions 27 of the clutch members 26 therein, so that the teeth of the walls 33 face outwardly from the outer edges of the sleeve or member 30, for cooperative clutching association with the teeth 46 of the clutch portions 43 of the brackets H. When in this position the openings 32 and 45 are in alignment. The sleeve or tubular member 30 must of course move with the frame F, and to this end the said tube or member 30 is slotted inwardly of its outer edges at 48, for receiving the upper portions of the frame body 10 therein, just below the cylindrical clutch head 27, as is illustrated in Figure 2 of the drawings.

The mounting and clutching tendency for the improved glare shield is accomplished by providing a sectional shaft structure 50, including the end shaft sections 51 and 52, apertured at their proximate ends and connected by means of a relatively strong spiral or other type of spring 54, the tendency of which is to draw the sections toward each other. Thus, the spring 54 is of the tension type. The free ends of the shaft section 51 and 52 are threaded, and adapted for extension thru the aligning openings 32 and 45, so that the screw threaded ends thereof extend exteriorly of the bracket arms 42, for receiving adjusting nuts 58 thereof, by means of which the shaft sections may be adjusted longitudinally of the sleeve or tubular member 30, for increasing or decreasing the tension effect of the spring 54.

From the foregoing description of this invention it is readily obvious that when the brackets H are rigidly mounted upon a part of the vehicle, with the details secured as above described, upon adjusting the nuts 58, the spring will be tensioned so that it will exert a pulling effect upon the shaft section 51 and 52 forcing the teeth 43 of the bracket arms 42 against the teeth of the clutching heads 27, in order to support the glare shield in a desired plane for use or disuse. It is readily obvious that the shield may be lifted or lowered manually, and the teeth 30 will ride over the teeth 46, due to the resiliency of the spring 54 which permits of movement. As the inherent tendency of the spring 54 is to pull inwardly it will continually exert its force upon the clutch parts to keep them in interlocked engagement for supporting the glare shield in a definite desired plane for shielding, or in an inoperative position.

Various changes in the shape, size, and arrangement of parts may be made to the form of invention herein shown and described, without departing from the spirit of this invention or the scope of the claims.

I claim:

1. In a glare shield the combination of a frame including clutch portions thereon, a pair of brackets, shaft sections pivotally mounting the clutch parts of the frame and brackets, and a tension spring connecting said shaft sections to normally urge the clutch parts of the frame and brackets into slidable clutching relation.

2. In a glare shield the combination of a shield member, a tube mounted for movement with the shield member, clutch parts at opposite ends of the tube movable therewith, brackets including clutch parts, shafts pivoting each of the clutch parts of the tube to a clutch part of the brackets, said shafts extending through said clutch parts into the tube and exteriorly thereof, means on the exterior ends of said shafts forming abutments adjacent said brackets, and spring means in the tube connecting the other ends of said shafts for forcing said clutch parts of the brackets against the clutch parts which are movable with said tube.

3. In a glare shield the combination of shield frame including clutch parts, brackets including clutch parts, relatively movable shafts pivoting each of the clutch parts of the frame to a clutch part of a bracket including abutments engaging against the clutch parts of the brackets with the shafts extending toward each other, and a spring connecting the proximate ends of said shaft for drawing said abutments against the clutch parts of the respective brackets to force the clutch parts of the frame and brackets into clutching engagement.

4. In a glare shield the combination of a shield supporting frame, brackets, shaft pins pivoting the frame at opposite sides to said brackets, said shaft pins being movable at their supporting connections with said brackets and frame, and providing abutments engaging against said brackets at the outer sides thereof, and a spring connecting the proximate ends of said pins to draw the pins towards each other.

5. In a glare shield the combination of a shield supporting frame, including spaced end portions having clutch heads thereon transversally apertured in aligning relation, a tubular member open at its ends for receiving the clutch heads in said open ends in keyed relation in said tubular member, brackets including clutch parts mounted for engagement at opposite ends of the tubular member against the clutch parts of said frame, independent shaft sections pivoted at each end of the tubular member to the clutch parts of the frame and brackets, nut means at the outer ends of said shaft sections in abutment against the bracket clutch parts for longitudinal adjustment of said shaft sections, and a spring under tension in said tubular member connecting the proximate ends of said shaft sections.

6. In a glare shield the combination of a substantially U-shaped channel frame including side portions and a free end portion with the grooves thereof in facing relation, a translucent shield element in said grooves, and a removable cross piece of channel formation at the opening of the U-shaped frame including lip extensions projecting into the grooves of the side portions of said U-shaped frame and receiving a marginal edge of the shield in the groove thereof.

7. In a glare shield the combination of a substantially U-shaped channel frame including side portions and a free end portion with the grooves thereof in facing relation, a translucent shield element in said grooves, a removable cross piece of channel formation at the opening of the U-shaped frame including lip extensions projecting into the grooves of the side portions of said U-shaped frame and receiving a marginal edge of the shield in the groove thereof, and clutch parts at the free ends of said side portions of the U-shaped frame including portions entering the grooves of said side portions of said U-shaped frame in abutment with the lip portions of said removable cross piece to hold the latter in position against the shield which fits into the groove thereof.

JULIUS C. FORD.